United States Patent [19]

Ahrens et al.

[11] 4,323,623
[45] Apr. 6, 1982

[54] COMPOSITE PLASTIC STRUCTURE AND METHOD FOR PRODUCING SAME

[75] Inventors: Robert O. Ahrens; Jerry L. Merkel, both of Florissant, Mo.

[73] Assignee: McDonnell Douglas Corporation, Long Beach, Calif.

[21] Appl. No.: 955,472

[22] Filed: Oct. 27, 1978

Related U.S. Application Data

[63] Continuation-in-part of Ser. No. 833,029, Sep. 14, 1977, abandoned.

[51] Int. Cl.³ .................. B32B 5/16; B32B 27/04; B32B 27/12; B32B 27/20
[52] U.S. Cl. ................. 428/246; 156/244.11; 156/244.26; 156/244.27; 156/307.5; 156/330; 156/381; 422/251; 422/252; 422/283; 422/284; 422/285; 422/286; 422/287; 422/297; 422/325; 422/406; 422/408; 422/902
[58] Field of Search ............... 428/283, 284, 286, 287, 428/246, 251, 252, 325, 406, 285, 902, 408; 156/244.11, 244.26, 244.27, 307.5, 330, 381

[56] References Cited

U.S. PATENT DOCUMENTS

| | | | |
|---|---|---|---|
| 3,554,851 | 1/1971 | Modigliani | 428/317 |
| 3,582,388 | 6/1971 | Stayner | 428/325 |
| 3,707,434 | 12/1972 | Stayner | 428/406 |
| 3,936,558 | 2/1976 | Bolen et al. | 428/285 |
| 3,996,654 | 12/1976 | Johnson | 428/325 |
| 4,013,810 | 3/1977 | Long | 428/317 |
| 4,028,477 | 6/1977 | Goppel et al. | 428/285 |
| 4,095,008 | 6/1978 | Sundstrom et al. | 428/325 |
| 4,121,008 | 10/1978 | Seddon | 428/285 |
| 4,178,406 | 12/1979 | Russell | 428/283 |

*Primary Examiner*—James J. Bell
*Attorney, Agent, or Firm*—Max Geldin

[57] ABSTRACT

Core sandwich structure comprised of a lightweight core material in the form of a low density thermosetting resin matrix composition containing glass microballoons, particularly an epoxy resin containing glass microballoons, sandwiched between high strength fiber-thermosetting resin matrix outer sheets, particularly woven graphite-epoxy sheets. Employing epoxy resin as the preferred thermosetting resin, the epoxy core material is B-staged, placed between sheets of pre-preg woven graphite-epoxy material, and the assembly co-cured under pressure to form the core sandwich structure.

19 Claims, 4 Drawing Figures

COMPOSITE PLASTIC STRUCTURE AND METHOD FOR PRODUCING SAME

This application is a continuation-in-part of copending application Ser. No. 833,029, filed Sept. 14, 1977, now abandoned.

BACKGROUND OF THE INVENTION

This invention relates to the fabrication of a strong composite plastic structure, and is particularly concerned with procedure for fabricating a high strength core sandwich structure in the form of a lightweight filler material or core positioned between high strength skin material or sheets, and with the resulting novel article, having particular utility as aircraft structural components.

In the production of aircraft components, it is conventional to employ a so-called "honeycomb core sandwich" structure, wherein a honeycomb formed of metal or plastic material, is positioned between and connected to outer skins of metal or fiber matrix material. However, such prior art structures are subject to certain disadvantages. In the first place, honeycomb core sandwich structures are relatively expensive to fabricate and when the honeycomb is formed of metal, presents corrosion problems. Further, it has been sought to provide components of reduced weight, yet having equivalent strength.

U.S. Pat. No. 4,013,810 to Long is directed to a sandwich panel construction comprised of a foam core of thermoplastic resin mixed with glass spheres sandwiched between two face sheets of fiber reinforced thermoplastic resin, wherein the thermoplastic resin of the core is the same as the thermoplastic resin of the face sheets. The apparently preferred thermoplastic resin employed according to the patent is polysulfone resin.

In Long, the sandwich panel thereof is produced by mixing a thermoplastic resin with a solvent to dissolve the resin, mixing hollow glass spheres with the dissolved thermoplastic resin, casting the mixture of the glass spheres and dissolved thermoplastic resin into a desired shape, drying the cast mixture to form a foam core, compression molding a mixture of thermoplastic resin with glass fibers to form a face sheet, and remolding under heat and pressure the face sheet to cause the thermoplastic resin to flow and to bond the face sheet to the foam core.

However, thermoplastics such as the polysulfone of Long, have the disadvantage that they soften by heating at relatively low temperatures, e.g. at temperatures ranging from about 160° to about 250° F., depending on the particular type of thermoplastic resin employed, thus limiting the upper temperature usage of the sandwich panels of the above patent.

Further, the thermoplastic sandwich structures of Long have the additional disadvantage that they are compression molded at high temperatures ranging from about 600° to 700° F. and utilizing pessures up to 200 psi.

It is also noted that Long states in the paragraph bridging colums 3 and 4 of the patent that if good adhesion between the core and the face sheets is required, it is advisable to interpose a layer of the thermoplastic resin common to the core and the face sheets, at the interface between the core and the respective face sheets before the face sheets are remolded to match the contour of the core.

U.S. Pat. No. 3,707,434 to Stayner dislcoses a rigidified resinous laminate or sandwich panel, comprising an outer sheet of an acrylic resin, a layer of polyester resin bonded to the acrylic sheet, such layer containing glass fibers and glass beads distributed therethrough, with a co-mingled second layer of a polyester resin bonded to the first layer, the second layer containing hollow plastic spheres in a stressed condition.

The method of making the reinforced plastic laminate of Stayner comprises applying the first polyester resin containing glass fibers and solid inert spheres onto an acrylic sheet, applying over the resulting uncured polyester surface a self-curing composition including a polyester resin, hollow plastic spheres and a curing agent for the polyester, and setting the polyesters by means of an exothermic reaction which expands the hollow plastic spheres, whereby upon cooling, the hollow plastic spheres are left in a stressed state.

However, the resinous laminate of Stayner is a relatively complex structure.

It is accordingly an object of the present invention to produce simple relatively inexpensive lightweight composite plastic structures particularly useful in the fabrication of aircraft structural components. A further object is the provision of procedure for production of a core sandwich structure comprised of a lightweight core material positioned between and connected to high strength outer skins, and to the sandwich structure so produced. A further object is to provide a core sandwich structure having the above characteristics, and which essentially avoids the above noted disadvantages of the prior art core sandwich structures.

SUMMARY OF THE INVENTION

The above objects are achieved according to the invention by the provision of a composite plastic or core sandwich structure which comprises a core material of a thermosetting resin matrix, e.g. an epoxy resin, containing microballoons, and adjacent outer layers of a fibrous material impregnated with a thermosetting resin matrix, preferably an epoxy resin. Thus, the core material is a lightweight material in the form of a low density thermosetting resin, e.g. epoxy resin, composition containing microballoons, particularly glass microballoons. The core material is positioned or sandwiched between high strength fiber thermosetting resin, preferably fiber-epoxy, outer sheets, particularly woven graphite-epoxy sheets, as described in greater detail below.

The above core sandwich structure is produced by partially curing or B-staging the thermosetting resin core material, e.g. the epoxy core material, placing such partially cured core material between sheets or skins of thermosetting resin impregnated fibrous sheets, e.g. pre-preg woven graphite-epoxy sheet or skins, and co-curing the assembly under pressure, e.g. in an autoclave, to form the core sandwich structure.

Such core sandwich structures formed of a thin sheet of lightweight filler or core material, comprised of a low density thermosetting, e.g. epoxy, resin composition containing a substantial portion of glass microballoons, as pointed out in greater detail hereinafter, sandwiched between high strength sheets or skins of fibrous material impregnated with a thermosetting resin, preferably an epoxy resin, particularly woven graphite-epoxy sheets, can provide equivalent strength with a weight savings of up to 25% over solid woven graphite-epoxy skin structures, in the absence of any core material. Further, the core sandwich structure of the invention is superior to the conventional honeycomb core sandwich structures in that the former has reduced fabrication cost, improved mechanical properties, no corrosion problems, reduced machining and drilling costs, and permits higher curing pressures.

The thermosetting sandwich core panels according to the present invention further have the advantage over the sandwich panel construction of the Long patent employing a thermoplastic resin such as polysulfone, that they do not soften and cannot be remelted once they are cured and can be employed at temperatures up to about 60° F., depending on the particular resin used. This is in contrast to a maximum softening temperature of about 250° F. for the thermoplastic resin of Long. Also, the thermosetting sandwich core panels according to the present invention require much lower temperatures for partial curing, e.g. from about 145° to about 155° F., and only about 350° F. for final co-curing of the core comprised of a thermosetting resin and containing microballoons and the two outer layers of fibrous material impregnated with thermosetting resin, to form the final sandwich assembly, at curing pressures of the order of 100 psi, as noted in greater detail hereinafter, in contrast to the high molding temperatures of up to 700° F. and the higher pressures of up to about 200 psi, required in compression molding the thermoplastic sandwich structure of Long.

Further, according to the present invention, no additional adhesive is required to bond the thermosetting core sheet to the thermosetting outer layers to obtain a strong integral bond between the core sheet and the outer layers following the final co-curing step, whereas in Long a layer of thermoplastic resin is interposed between the core and the respective face sheets in order to obtain good adhesion between the core and the face sheets.

DETAILED DESCRIPTION OF THE INVENTION

According to one mode of practice of the invention, the method for fabrication of the core sandwich structure hereof comprises applying the lightweight core material between a pair of plastic sheets, such as Teflon (polytetrafluoroethylene) coated Mylar (polyester) sheets, applying pressure to the ligthweight core material as by squeezing the sheets containing the core material by suitable means such as squeeze rollers, approximately to the required thickness, and partially polymerizing the lightweight core sheet, comprised of a thermosetting resin, preferably epoxy resin, and glass microballoons, sandwiched between mold plates under heat and pressure.

The lightweight core material is a thermosetting resin matrix, preferably an epoxy resin, containing a substantial proportion or volume of microballoons, providing a lightweight yet strong plastic structure when cured. Various thermosetting resins or polymers can be used as matrix material for the core, including epoxy, polyimide, polyester, polyurethane and phenolic resins.

The preferred thermosetting resin or resin matrix materials for the core are epoxy and polyimide resin, particularly the former. Various epoxy resins can be employed in the core material composition. Preferred epoxies for this purpose comprise the glycidyl ethers such as the glycidyl ethers of the phenols and particularly those prepared by reacting a dihydric phenol with epichlorhydrin, e.g. the diglycidyl ether of bisphenol A; and the epoxy novolac resins, which are phenolic epoxies. Other suitable epoxies are epoxidized polyolefin, epoxidized soybean oil, bis-(2,3-epoxy-cyclopentyl) ether, vinylcyclohexene dioxide, dicyclopentadiene dioxide, butadiene dioxide, diglycidyl ether of butanediol, diglycidyl ether of tetrachlorobisphenol A, diglycidyl ether of resorcinol, diglycidyl ester of dimeric linoleic acid, triglycidyl ether of glycerol, polyglycidyl ethers of glycol, diglycerol, mannitol, and the like.

Such epoxy core compositions can also incorporate a suitable curing agent such as polyamines, e.g. p-phenylene-diamine, or polyamides, as is well known in the art, such curing agents being incorporated at the time of use of the core composition.

The term "microballoons" denotes small low density hollow particles or spheres of material, which are known commercially available products. Preferably, glass microballoons are incorporated into the thermosetting resin matrix of the core material, but other microballoons such as plastic microballoons, e.g. formed of phenolic resin, also can be employed. The microballoons, e.g. glass microballoons, can be present in an amount ranging from about 60 to about 70%, the thermosetting resin matrix, e.g. epoxy resin, being present in amount ranging from about 40 to about 30%, by volume of the core material. The microballoons can thus occupy a substantial or major portion of the volume of the core material or core sheet. An effective epoxy resin core material composition is the material marketed as Pro-Seal 828 by Coast Pro-Seal Division of Essex Chemical Corporation, Compton, Calif. Such material contains about 38% epoxy resin and about 62% glass microballoons, by volume. Another representative material is that marketed as Hexcell-HX 501. In such epoxy compositions employed as core material, the greater the volume of microballoons employed, the more lightweight is the resulting epoxy composition. However, sufficient epoxy resin is required in the composition to provide a core material in which all of the microballoons are sufficiently coated to provide a core material of good strength following curing.

The thermosetting resin matrix, e.g. epoxy, core composition or filler material, can be sandwiched between suitable pressure plates, and partially cured in an autoclave, e.g. at pressure ranging from about 100 to about 150 psi, and at temperatures ranging from about 145° to about 155° F., for a period ranging from about 45 to about 55 minutes. However, it will be understood that the above pressure, temperature and time ranges are only exemplary.

The partially polymerized core sheet is removed from the autoclave and cooled. At this point the lightweight core sheet is essentially non-tacky and can be readily handled. The sheet is flexible enough to conform to a required contour. The thickness of the core sheet can range from about 0.02 inches to about 0.5 inch.

The partially polymerized thermosetting resin matrix, e.g. epoxy, lightweight core material containing microballoons, is placed or sandwiched between high-strength pre-impregnated fibrous skin material, such material being in the form of fibrous sheets impregnated with a partially cured thermosetting resin, e.g. woven graphite-epoxy prepreg, the epoxy resin therein being partially polymerized. The thermosetting resin matrix of the outer sheets or skin material can be any of the thermosetting resins noted above, such as epoxy and polyimide resins, preferably epoxy, e.g. in the form of the condensation product of bisphenol A and epichlorhydrin. The reinforcing fibers of the fibrous material employed as reinforcement for the resin of the outer sheets, and which is impregnated with such resin, can include graphite, glass, boron, nylon (polyamide), polyimide and poly (paraphenyl terephthalamide) fibers, or woven fibers or fibrous materials comprised of such fibers, such as woven graphite. Thus, examples of fiber reinforced thermosetting resin or resin matrix skin materials, include fiberglass reinforced epoxy, Kevlar reinforced epoxy, the Kevlar material being understood as comprised of poly (paraphenyl terephthalamide), and graphite reinforced polyimide. The thickness of the skin material or of each of the respective outer sheets of the sandwich can range from about 0.01" to about 0.25".

The core sandwich assembly is placed in an autoclave and subjected to pressure of about 50 to about 150 psi, e.g. 100 psi, and temperature ranging from about 300° to about 375° F., e.g. about 350° F., for a period of time which can range from about one half hour to about 10 hours, to co-cure the thermosetting resin matrix, e.g. epoxy, core material and the high-strength fiber reinforced thermosetting resin matrix, e.g. epoxy, skin material of the sandwich to produce final cure. After removal of the cured core sandwich from the autoclave, the inner core material is integrally bonded to each of the outer fiber reinforced thermosetting resin matrix e.g. epoxy, sheets or skin material. The thickness of the overall core sandwich including the inner core material and the two outer sheets can range from about 0.04" to about 1.0".

The resulting cured high-strength lightweight core sandwich can be used as a structural material particularly for aircraft components such as for doors, fairings, fuselage skin components and fuselage floor/bulkhead structures, as elements of substructure and planar laminates such as wings and tail surfaces, and can be used to form integral stiffeners, frames, longerons and intersections thereof.

The invention will be more readily understood by the example of practice of the invention set forth below, taken in connection with the accompanying drawing wherein.

Figure 1:
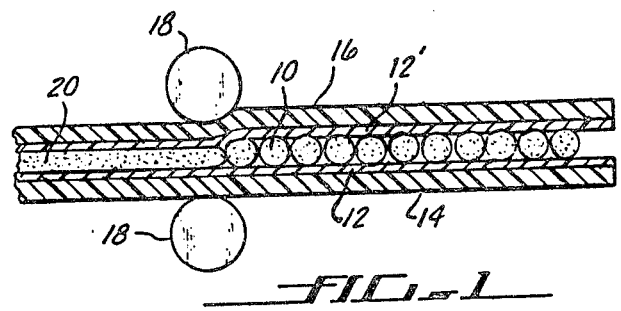
FIG. 1 illustrates fabrication of the epoxy core sheet.

Referring to FIG. 1 of drawing, beads 10 of Pro-Seal 828 epoxy resin containing 62% by volume glass microballoons, are extruded onto a Teflon film 12, placed over a Teflon coated fiberglass film 14. Another Teflon film 12' is placed over the extruded beads of Pro-Seal core material and a layer of Mylar film 16 is positioned over the Teflon film 12'.

The four plies of film material with the beads of core material therebetween, are passed through rollers 18, which are set at a distance apart based on the required thickness of the core sheet plus about 0.005 to 0.010". The passing of the core material beads 10 through the rollers 18, causes the beads to be flattened into a dense integral core material sheet 20.

Figure 2:
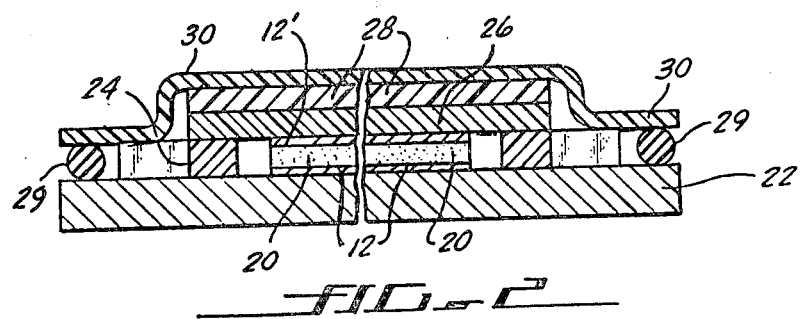
FIG. 2 illustrates "B" staging of the core sheet.

The outer sheets 14 and 16 are removed, and the remaining assembly including the core sheet 20 and the adjacent outer Teflon films 12 and 12' are trimmed to the required size, and this assembly, now referring to FIG. 2 of the drawing, is placed on a tool 22, and metal dams 24 are placed around the periphery of the core sheet assembly. An aluminum plate 26 is placed on top of the assembly including core sheet 20 and the Teflon layers 12 and 12', the plate 26 extending over the metal dam 24. A glass cloth breather 28 is placed over the aluminum plate 26, and the assembly is enclosed in a vacuum bag 30 placed over the seals 29.

The vacuum bag assembly shown in FIG. 2 is then placed in an autoclave pressurized to about 150 psi and the temperature raised to about 150° F. in 30 to 45 minutes, and held at the latter temperature for 45 to 55 minutes. The assembly is then cooled to 90° F. in 60 to 75 minutes. This operation causes partial polymerization or "B" staging of the epoxy core sheet 20. The resulting assembly including the partially polymerized core sheet 20 and the adjacent Teflon films 12 and 12' is then removed from the autoclave, and the Teflon films are stripped from the core sheet.

Figure 3:
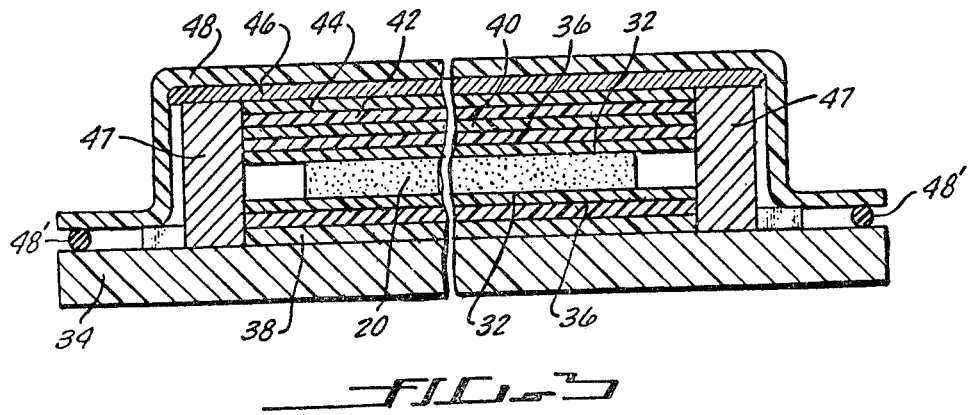
FIG. 3 illustrates final curing of the core sheet assembled with the outer skin material to form the core sandwich.

Now referring to FIG. 3, the partially polymerized epoxy core sheet 20 is laid up between a pair of woven graphite-epoxy impregnated prepreg sheets 32, the epoxy-resin in such sheets being partially polymerized. This assembly is placed on the tool 34, the assembly including the core sheet 20 and the outer graphite-epoxy sheets 32, being disposed between a pair of peel plies 36 formed of nylon or fiberglass, with a film of Teflon 38 disposed between the lower peel ply and the tool 34.

Over the above noted assembly are placed in succession, films of perforated Teflon coated glass fiber 40, glass or paper bleeder cloth 42, perforated nylon inner bag 44 and a glass cloth breather 46. Dams 47 are placed around the periphery of the entire assembly, and a vacuum bag 48 is placed over the entire assembly and over the seals 48'.

The lay-up shown in FIG. 3, including the core sandwich formed of the core material and the adjacent outer layers of woven graphite-epoxy material, is placed in an autoclave and the temperature increased to about 240° F. with autoclave pressure at 10 to 15 psi and a vacuum of 24 to 29 inches of mercury. Autoclave pressure is raised to 85 psi, and the vacuum bag is vented to the atmosphere when the autoclave pressure reaches 20 psi. The assembly is held for about 60 to 70 minutes at 240° F. and 85 psi pressure, and at the end of this period the temperature is raised to about 350° F. and maintained at about 350° F. and 85 psi for about 120 minutes. This operation results in co-curing both the epoxy core material 20 containing the glass microballoons, and the epoxy resin of the outer graphite-epoxy sheets 32. The assembly is then cooled and removed from the autoclave and is disassembled, to obtain the core sandwich 50 formed of the finally cured core material 20 containing glass microballoons 49, integrally attached to the adjacent outer layers or skins 32 of woven graphite impregnated with finally cured epoxy resin, as illustrated in FIG. 4.

It will be understood that in place of forming the core material 20 by extruding beads of the thermosetting resin, e.g. epoxy, material containing glass microballoons, squeezing the beads between rollers to form the core sheet and "B" staging the resulting epoxy core sheet, a core sheet 20 formed of thermosetting resin material and containing such microballoons, and initially in sheet form and previously "B" staged can be employed.

Figure 4:
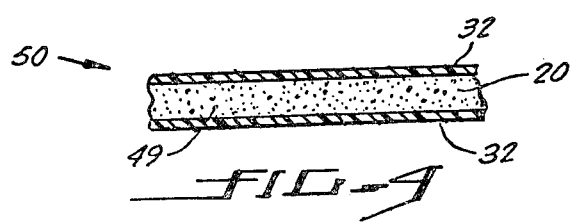
FIG. 4 illustrates the resulting cured integral core sheet sandwiched between the outer sheets or skin material.

The cured core sheet 20 of the core sandwich 50 illustrated in FIG. 4, has a thickness of about 0.06", and the overall core sandwich 50 including the outer cured graphite-epoxy layers 32 has a thickness of about 0.15".

From the foregoing, it is seen that the invention provides a novel lightweight high strength composite plastic or core sandwich structure which is of simple construction and readily fabricated from commercially available materials and compositions, and procedure for assembling and fabricating such structure, including forming a core material of a matrix of thermosetting resin such as an epoxy resin and preferably glass microballoons, in a partially cured state and which is still pliable, and which can be formed to complex contours, but will hold its shape when placed between outer layers of fiber impregnated partially cured thermosetting resin, followed by final co-curing of the assembly. The core sandwich so produced has wide utility for use as aircraft structural components, to replace conventional heavier and more complex structural materials, and can also be used in other commercial applications such as boat hulls, automobile structure, and transportation media structures generally.

While certain exemplary embodiments of this invention have been described above and shown in the accompanying drawings, it is to be understood that such embodiments are merely illustrative of, and not restrictive on, the broad invention and that we do not desire to be limited in our invention to the specific dimensions, constructions or arrangements shown and described since various other obvious modifications may occur to persons having ordinary skill in the art.

What is claimed is:

1. A composite plastic structure consisting of a core material of a thermosetting resin containing a major volume of glass microballoons, and adjacent outer layers of a fibrous material impregnated with a thermosetting resin, wherein said resin of said core material and of said outer layers is a thermosetting resin selected from the group consisting of epoxy, polyimide, polyester, polyurethane and phenolic resins, said fibrous material being selected from the group consisting of graphite, glass, boron, polyamide, polyimide and poly (paraphenyl terephthalamide) fibers and woven fibers.

2. A core sandwich structure consisting of a core sheet of a cured thermosetting resin containing a major volume of glass microballoons dispersed in said resin, sandwiched between and integrally bonded to outer sheets of a fibrous material impregnated with a cured thermosetting resin, wherein said resin of said core sheet and of said outer sheets is a thermosetting resin selected from the group consisting of epoxy, polyimide, polyester, polyurethane and phenolic resins, said fibrous material being selected from the group consisting of graphite, glass, boron, polyamide, polyimide and poly (paraphenyl terephthalamide) fibers and woven fibers.

3. The core sandwich structure as defined in claim 2, said resin of said core sheet and of said outer sheets being selected from the group consisting of epoxy and polyimide resins.

4. The core sandwich structure as defined in claim 2, said microballoons occupying from about 60% to about 70% of the volume of the core sheet, and said resin occupying about 40% to about 30% of said volume.

5. A core sandwich structure comprising a core sheet consisting of a cured thermosetting resin matrix containing a substantial volume of microballoons dispersed in said matrix, sandwiched between and integrally bonded to outer sheets of a fibrous material impregnated with a cured thermosetting resin matrix, said microballoons being glass microballoons, said fibrous material being woven graphite.

6. A core sandwich structure comprising a core sheet consisting of a cured thermosetting resin matrix containing a substantial volume of microballoons dispersed in said matrix, sandwiched between and integrally bonded to outer sheets of a fibrous material impregnated with a cured thermosetting resin matrix, said microballoons being glass microballoons and occupying from about 60% to about 70% of the volume of the core sheet, and said resin matrix being an epoxy and occupying about 40% to about 30% of said volume, said fibrous material being woven graphite.

7. A method of fabricating a core sandwich structure which comprises partially polymerizing a core sheet containing a thermosetting resin matrix and a substantial volume of microballoons, said core sheet having sufficient flexibility to conform to a desired contour, placing said core sheet between outer layers of a fibrous material impregnated with a thermosetting resin matrix which has been partially polymerized, and co-curing said partially polymerized core sheet and said partially polymerized outer layers, to finally cure said core sheet and said outer layers, and integrally bonding said core sheet to said outer layers, wherein said resin matrix of said core sheet and of said outer layers is an epoxy resin, said partial polymerization of said core sheet taking place at temperature ranging from about 145° to about 155° F. and at 150–200 psi.

8. The method as defined in claim 7, said co-curing taking place at temperature ranging from about 300° to about 375° F. and at pressure of about 50 to about 150 psi.

9. The method as defined in claim 7, wherein said resin matrix of said core sheet and of said outer layers is a thermosetting resin selected from the group consisting of epoxy, polyimide, polyester, polyurethane and phenolic resins.

10. The method as defined in claim 7, said microballoons being glass microballoons.

11. The method as defined in claim 7, said microballoons being glass microballoons, and wherein said resin matrix of said core sheet and of said outer layers is an epoxy resin.

12. The method as defined in claim 7, said microballoons occupying a major portion of the volume of said core sheet.

13. The method as defined in claim 7, said fibrous material being selected from the group consisting of graphite, glass, boron, polyamide, polyimide and poly (paraphenyl terephthalamide) fibers and woven fibers.

14. A method of fabricating a core sandwich structure which comprises partially polymerizing a core sheet containing a thermosetting resin matrix and a substantial volume of microballoons, said core sheet having sufficient flexibility to conform to a desired contour, placing said core sheet between outer layers of a fibrous material impregnated with a thermosetting resin matrix which has been partially polymerized, and co-curing said partially polymerized core sheet and said partially polymerized outer layers, to finally cure said core sheet and said outer layers, and integrally bonding said core sheet to said outer layers, said microballoons being glass microballoons, and wherein said resin matrix of said core sheet and of said outer layers is an epoxy resin, said fibrous material being woven graphite.

15. A method of fabricating a core sandwich structure which comprises partially polymerizing a core sheet containing a thermosetting resin matrix and a substantial volume of microballoons, said core sheet having sufficient flexibility to conform to a desired contour, placing said core sheet between outer layers of a fibrous material impregnated with a thermosetting resin matrix which has been partially polymerized, and co-curing said partially polymerized core sheet and said partially polymerized outer layers, to finally cure said core sheet and said outer layers and integrally bonding said core sheet to said outer layers, said microballoons being glass microballoons, said microballoons occupying from about 60% to about 70% of the volume of the core sheet, and said resin matrix occupying about 40% to about 30% of said volume, said fibrous material being woven graphite.

16. A method of fabricating a core sandwich structure which comprises partially polymerizing a core sheet containing a thermosetting resin matrix and a substantial volume of microballoons, said core sheet having sufficient flexibility to conform to a desired contour, placing said core sheet between outer layers of a fibrous material impregnated with a thermosetting resin matrix which has been partially polymerized, and co-curing said partially polymerized core sheet and said partially polymerized outer layers, to finally cure said core sheet and said outer layers, and integrally bonding said core sheet to said outer layers, said partial polymerization of said core sheet and said co-curing of said core sheet and said outer layers taking place in an autoclave.

17. A method of fabricating a core sandwich structure which comprises partially polymerizing a core sheet containing a thermosetting resin matrix and a substantial volume of microballoons, said core sheet having sufficient flexibility to conform to a desired contour, placing said core sheet between outer layers of a fibrous material impregnated with a thermosetting resin matrix which has been partially polymerized, and co-curing said partially polymerized core sheet and said partially polymerized outer layers, to finally cure said core sheet and said outer layers, and integrally bonding said core sheet to said outer layers, including forming said core sheet by extruding beads of said resin matrix containing microballoons, between plastic sheets, and passing the resulting asembly between pressure rollers.

18. The method as defined in claim 17, said resin matrix being an epoxy resin.

19. A method of fabricating a core sandwich structure which comprises providing a core sheet of a partially polymerized thermosetting resin matrix containing a substantial volume of microballoons, said core sheet having sufficient flexibility to conform to a desired contour, placing said core sheet between outer layers of a fibrous material impregnated with a partially polymerized thermosetting resin matrix and co-curing said core sheet and said outer layers, to finally cure said core sheet and said outer layers, and integrally bonding said core sheet to said outer layers, said microballoons being glass microballoons, said partially polymerized resin matrix of said core sheet and said outer layers being a partially polymerized epoxy resin, and said fibrous material being woven graphite.

* * * * *